W. C. BUCKNAM.
FLAME WELDING MACHINE.
APPLICATION FILED OCT. 24, 1918.

1,341,839. Patented June 1, 1920.
6 SHEETS—SHEET 1.

Fig. 1.

INVENTOR
Worthy C. Bucknam
ATTORNEY

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

FLAME-WELDING MACHINE.

1,341,839.      Specification of Letters Patent.      Patented June 1, 1920.

Application filed October 24, 1918. Serial No. 259,512.

*To all whom it may concern:*

Be it known that I, WORTHY C. BUCKNAM, a citizen of the United States, and a resident of Jersey City, in the county of Hudson and State of New Jersey, have invented a new and useful Flame-Welding Machine, of which the following is a specification.

The invention comprises certain improvements in apparatus for effecting automatic welding by the autogenous flame process, and is more particularly concerned with a machine for welding the seams of successive pieces of work passed one after another through the machine. The objects are to secure a good, uniform union in the different parts of the weld, and to provide a design of machine which will have large capacity, and be simple, compact, readily adjustable, and easily attended. If a seam to be welded and a welding flame of appropriate power are mechanically supported in proper relation, and one or the other is driven at the appropriate uniform speed in the direction of the seam, a good union can be produced throughout the intermediate regions, but the forward end of the seam which receives the heat first, will not be welded, and the rear end, which has no metal ahead of it to conduct away part of the heat, will be burned. In the welding of long lengths or continuous tubing the ends can be cut off and thrown away, but in the case of short pieces or parts already formed to length, these bad ends have been a serious drawback. The difficulty is hereby overcome in a novel manner.

In accordance with the preferred embodiment of the invention, the successive pieces are advanced one at a time by reciprocatory pusher mechanism to a definite position in a longitudinal path, through which the pieces travel toward and from the relatively stationary nozzle of a welding torch. Arrived at the said position, the piece is acted upon by a pair of timing and driving rollers, having separate driving segments, whereby the piece is carried forward to bring the front end of its seam to the welding point, where it is caused to rest until the weld commences, whereupon the second segments set the piece in motion again and traverse the seam beneath the torch at the desired uniform speed. Succeeding plain rollers continue the movement, and as the rear end of the seam approaches the flame, and at a definite distance in advance thereof, the flame is moved by automatic means coördinated with the drive, in such manner that the heat added to the terminal portion of the weld is proportionately diminished to compensate for the accumulation of heat in this region due to conduction from the already welded regions behind. This is most simply accomplished by cam mechanism acting on the torch and appropriately formed and timed to perform its function; the typical case being one in which the cam is so shaped as to cause the flame to rise, with a gradual, accelerating movement. The cam may also be provided with regions for lifting or withdrawing the flame at predetermined intermediate points, corresponding to the location of openings or other regions in the work which would tend to cause overheating at the adjacent portions of the weld, the lifting being such as to neutralize this condition.

In the accompanying drawings forming a part hereof.

The mechanism is shown mounted at a convenient height upon a cabinet base 1, from which rise uprights 2 carrying a table 3. On the latter is a guide trough 4. The machine as illustrated is adapted to weld short rectangular tubular bodies *a* having a longitudinal seam *b*, and the guide is correspondingly formed; but the apparatus may obviously be designed to operate upon work of various specific kinds.

The articles are placed one at a time by hand, or may drop by gravity from a magazine (not shown), into the rear portion of the guide, against a vertical, movable pin 5, then stationary and serving as a gage. Said pin projects upward through a slot 6 in the table from a slide 7, which is slidably mounted in suitable bearings 8 to reciprocate beneath the table lengthwise of the guide. The forward part of the slide bears a downwardly projecting pin 9, which is in the circular path of movement of an arm 10 on a rotary driven shaft 41ª, referred to hereinafter. By this means the slide with its pusher pin 5 is drawn forward at intervals in proper relation to the operation of the other mechanism, and is retracted, when the arm 10 escapes from the pin 9, by a weight 11. The rearward position of the slide is determined by a suitable stop, such as a rear flange 12 on the table coöperating with an end flange 13 on the slide, and the forward position depends upon the relations of the rotary and reciprocatory parts and particularly upon the length of the arm 10.

The forward movement of the slide accordingly advances the body to a definite position, where it is entered between a pair of rollers 14 and 14ª mounted on vertical shafts 15, 15ª at opposite sides of the trough, the latter being provided with openings 16 through which the rollers operate. From this region onward the trough is preferably provided with inward projecting top flanges 17 to prevent possible vertical displacement of the bodies as they travel beneath the welding torch 18.

This torch, which will be understood to be an ordinary oxyacetylene blowpipe or like means for delivering an autogenous welding flame, is mounted over the trough in such manner as to direct its welding jet rearwardly and downwardly upon the seam to be welded at a point somewhat beyond the rollers 14, 14ª. By rearwardly is of course meant, relatively to the direction of movement of the work, the effect of the inclination being to preheat the unwelded portions of the seam as they advance to the welding point. The torch is shown as of the straight variety, held in a tubular holder 19, wherein it may be adjusted in the direction of its length by means of a rack 20 and a pinion (not seen) operable by a thumb-wheel 21, in a well-known manner. The holder, in turn, is mounted by means of a bracket arm 22 upon a rearwardly projecting tiltable arm 23, carried by a transverse rock-shaft 24, which is journaled in bearings on posts 25 rising from the forward or delivery end of the table.

An arm 26 projects downward from said rock-shaft, and is connected by a link 27 with one arm of a bell-crank lever 28, the other arm 29 of which extends over a face cam 30 secured to the vertical shaft 41ª previously mentioned.

An adjustable follow abutment 31 on the arm 29 bears upon the top of said cam, against which it is held by the tension of a spring 32, the various parts described in connection with the torch constituting a lifting mechanism, and also serving to hold the torch, and flame, at a definite, adjusted distance, vertically, from the seam, except when the torch is lifted for the specific purposes to be described.

Returning now to the body $a$ which was advanced by the pusher and left between the rollers 14, 14ª, it will be observed that these rollers are not plain circular members, but are provided with active or driving portions 33, 34, separated by a gap or inactive portion 35, the width of which must be carefully proportioned, and which determines a brief period of rest in the advance of the body $a$ when its forward end has reached, or substantially reached the welding point, that is to say when the flame of the torch is playing approximately upon the front end of the seam and directing its preheating gases rearwardly over the initial section thereof. The function of the driving portion 33 of each roller is to bring the body to the welding point, and that of the portion 34 to propel it onward at appropriate uniform speed in its welding traverse beneath the torch, following the interval governed by the gap 35.

The segment 33 of each roller may be termed the first driving segment and the segment 34 the second driving segment. By reference to the drawing it will be seen that these segments are also separated by another, and preferably wider, gap 36, the location of which upon the rollers is such that it embraces the arrival of the body between the rollers; that is to say, the driving connections for the parts are so coördinated that the body reaches the definite position assigned to it by the pusher while the inactive regions 36 face inwardly so that the rollers do not exert traction. The first driving segments 33 being of definite length, it follows that when they come around and grip the body they will forward it to another definite position, which as stated is one in which the forward end of its seam is presented to the flame. The driving segments are advantageously made of separate pieces from the bodies of the rollers, to which they are adjustably secured by screws 37 clamping upon the edges of arcuate slots 38. Thus, all the exact timing in respect to the movement of the work is governed from these rollers, which is a matter of advantage for the manufacturer, and also for the user if adjustment is provided for, as indicated. In the latter event the timing may be varied by angularly shifting one or other or both of these directly accessible segments. Such adjustment, it will be perceived, will vary the period of rest controlled by the gaps 35, but need not change the position at which the rest occurs, because the circumferential length of the segments 33 will not be changed. By substituting other segments of greater or shorter lengths, the distance which they move the body $a$ can of course be altered. As the said body arrives between the rollers at a time when the gaps 36 are facing inward, that is to say during a period of inactivity, and as these gaps are of substantial width, the precise moment at which the body is advanced by the pusher is not essential, the only requirement in respect to this portion of the apparatus being that it leave the bodies always in the same position, so that they will be forwarded always to the same position of rest by the segments 33.

The welding traverse, which follows the interval during which the initial portion of the seam becomes heated, and which is initiated by the segments 34, is completed by a pair of plain driven rollers 39, $39^a$ of the same radius of curvature as said segments, located beyond the timing rollers, where they operate through openings 40 in the sides of the trough, and mounted upon vertical shafts 41, $41^a$. Of these the shaft $41^a$ carries the arm 10 and cam 30 previously described, the cam 30 being disposed on top of the roller $39^a$.

When the pieces pass from the grip of the rollers 39, $39^a$ the welding of the seam has been completed, and thereafter each piece will be pushed out from the forward end of the trough by the piece which follows behind.

The machine receives power through a band pulley 42 on the end of a transverse driving shaft 43. Slidably splined to this shaft is a friction wheel 44, which may be adjusted in and out by means of a hand wheel 45 and a screw 46, the latter acting upon a yoke 47 embracing the wheel 44. A large friction disk 48 is slidably splined to a longitudinal shaft 49 with its face opposed to the periphery of the shiftable driving wheel 44. A spring 50 holds the disk in operative engagement with the wheel, and the disk may be withdrawn from engagement by means of a hand lever 51 pivotally fulcrumed at 52 and having a fork 53 engaging a grooved hub 54 on the disk. A pivoted catch 55 is provided for holding the power lever 51 in the open or idle position against the tension of the spring 50, this catch being provided with a handle 56 located in convenient proximity to the handle end of the lever 51.

Figure 3:
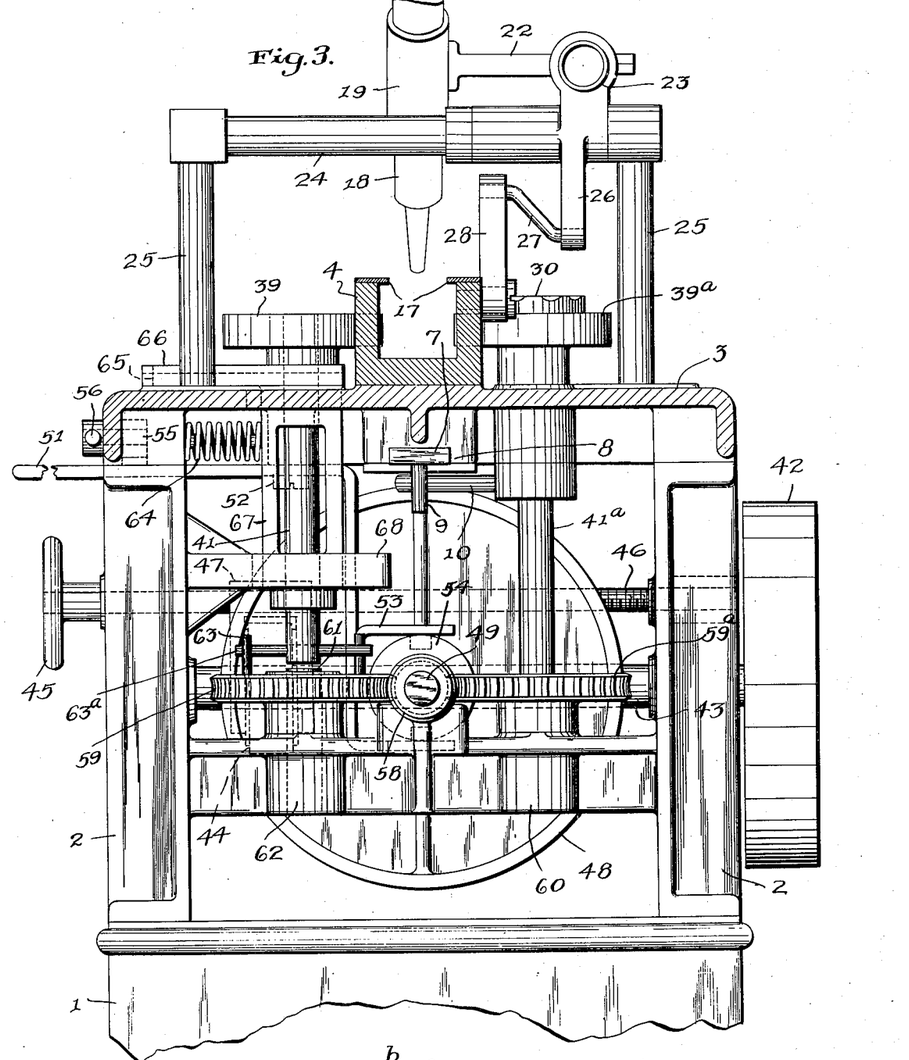
Fig. 3 is a vertical, transverse section through the table and guide on the line 3—3 of Fig. 2, other parts being shown in elevation.
Figure 4:
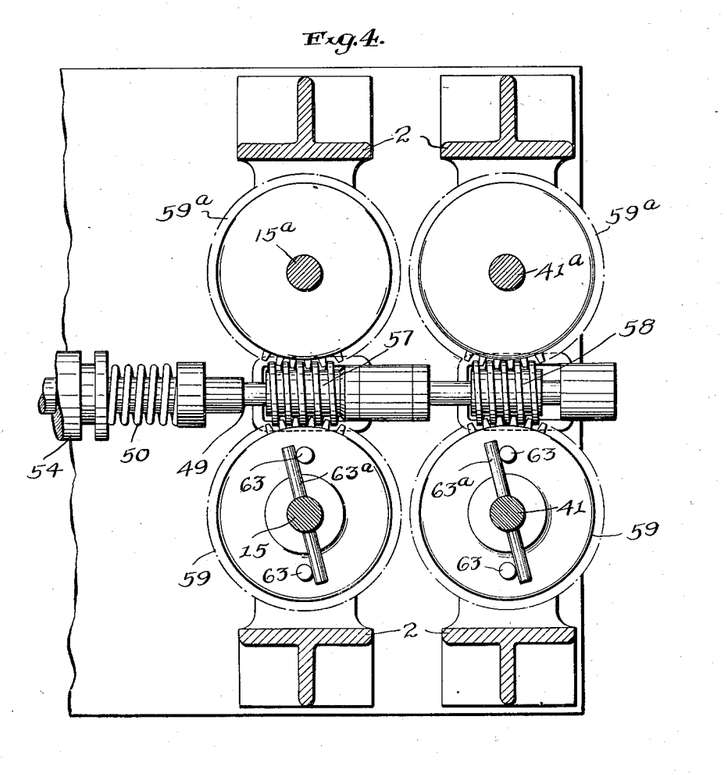
Fig. 4 is a horizontal section on the line 4—4 of Fig. 1.
Figure 5:
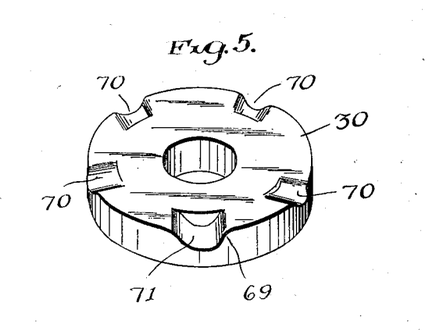
Fig. 5 is a detail of the cam.
Figure 6:
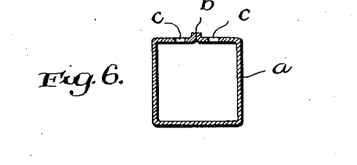
Fig. 6 is a cross-section of a piece of work to be welded.

The shaft 49 bears two duplicate worms 57 and 58. Of these the worm 58 meshes with a pair of worm wheels 59 and $59^a$ at opposite sides, as seen in Fig. 3. The wheel $59^a$ is fixed upon the vertical shaft $41^a$, already mentioned, this shaft being journaled in fixed bearings 60. The worm wheel 59 is on a short vertical shaft 61 mounted in the frame at 62 and has flexible driving connection with the shaft 41 of the roller 39 through vertical and horizontal pins 63 and $63^a$ on said gear and shaft, respectively. This connection permits the roller 39 to move toward and from its mate $39^a$ under the pressure of a spring 64, in order to secure the proper driving engagement between the rollers and the work. To this end the shaft 41 is journaled in a frame having a horizontal upper portion 65, slidably guided for movement transversely of the machine between overhanging ledges 66, and a downwardly extending portion 67 guided between fixed frame members 68, the spring 64 being interposed between the said portion 67 and a stationary abutment on the frame.

The two timing rollers 14 and $14^a$ are mounted and driven in the same manner as the rollers 39 and $39^a$, that is to say, the shaft $15^a$ is journaled in fixed bearings and provided at its lower end with a duplicate worm wheel $59^a$ driven by the worm 57. While the shaft 15 is journaled in a slidable frame comprising horizontal and vertical portions 65 and 67, identical with those of the frame which carries the shaft 41 of the roller 39, and guided in the same manner by members 66 and 68, the lower end of this shaft 15 is driven from a duplicate worm wheel 59 through the same form of flexible connection 63, $63^a$ as is used in connection with the shaft 41. The roller 14 through its shaft and slidable frame is pressed toward the roller $14^a$ by a spring, which is not illustrated, since it constitutes a duplicate of the spring 64.

From the foregoing it will be understood that the work-driving rollers are operated in unison and that the speed with which the pieces travel relatively to the flame may be adjusted to the exact degree which will produce proper welding by shifting the friction roller 44 toward or from the axis of the disk 48. As is well understood, the proper welding speed in any case depends upon a number of factors, including the power of the flame and the thickness and character of the metal. While the timing rollers 14, $14^a$ revolve continuously, their drive upon the work is intermittent, as determined by the segments 33 and 34 and the intervals 35 and 36 in the manner already described. The shaft $41^a$ of the plain roller $39^a$ carries the arm 10, which operates the pusher slide 7 and the cam 30 of the torch-lifter mechanism, which are thus operated in proper relation to the other parts of the machine. It will be appreciated that the spring-pressed rollers 14 and 39 might, though with less advantage, be idle rollers, and in that event the driving connections 61, 63, $63^a$ would be omitted and the roller 14, instead of being a segmental timing roller, would be a plain roller. It is preferred, however, to drive both members of each pair of rollers, in which case the roller 14 as well as the roller 14ª must be provided with the segments 33 and 34, which segments are placed in corresponding positions upon the two rollers, having reference to their reverse directions of rotation.

The function of the torch-lifting mechanism is to equalize the heating at particular portions of the seam, and especially at the terminal portion thereof, where a lower conductive capacity in the piece or pieces being welded would otherwise result in overheating and burning of the metal at the point of fusion. The same result could be obtained by varying the speed of longitudinal movement of the work when these regions come beneath the flame, but the simple principle here employed is to provide means for producing a uniform speed of travel, combined with means for causing a brief period of rest at the initial end of the weld and means for effecting a hastened or accelerated withdrawal of the flame at the terminal portion of the weld. A controlled withdrawal of the flame is effected by means of the cam 30, which is formed with a slope or declivity 69, which is so positioned as to come beneath the follower screw 31 on the torch-lifter lever 28 at a time when the rear end of the seam has progressed to within a short distance of the welding point. The exact time at which this control portion of the cam comes into action must be determined with respect to the particular work to be operated upon and the power of the flame, and the cam will be correspondingly designed or other cams may be substituted, as the case may be. In any event means are provided for causing the flame to rise at a predetermined point in advance of the end of the seam, so that the heat which accumulates at this region, by reason of the fact that there is no metal beyond to conduct it away, is not augmented to the point of producing destructive action upon the molten material. While approximate results might be secured by an abrupt, limited lifting of the flame before the end of the seam is reached, the most favorable condition is one in which there is a controlled accelerating flame movement, so that the added heat is decreased, first gradually and then more rapidly as the end of the seam comes to the welding point. This is indicated in the cam declivity 69, which, it will be observed, is curved so as to have a moderate slope at first, continuing into a steep descent. The descent upon the cam, it will be understood, is converted by the particular linkage employed into a lifting motion of the torch, and since the latter is an angular movement about the center 24, there is a certain longitudinal or horizontal component; and such longitudinal movement of the flame reverse to the travel of the work could, with appropriate modification of design, such as will suggest itself to the mechanic, be relied upon to secure the hastened withdrawal of the flame toward the latter end of the seam; the substantial effect in either case being to diminish the added heat without altering the uniform speed of travel of the work.

In addition the means for controllably varying the heat supplied by the flame may be utilized at intermediate regions of the weld, where differentiation exists in the structure of the portions to be united. Thus, in the particular case under consideration, the tubular bodies $a$ possess pairs of openings $c$ located at intervals at opposite sides of the seam, and at these spots the weld would be injuriously overheated if the same rate of traverse and the same working distance were maintained. To overcome this condition, the automatic control means, represented by the cam 30, is formed with a corresponding series of regions 70, which are so formed and positioned as to cause the flame to rise and descend slightly when the portions of the seam between the holes $c$ arrive beneath it. The said cam regions 70 constitute recesses in the illustrated construction and have their opposite sides sloped to coöperate with the follower 31 in such manner as to produce a movement of the torch which is smooth and controlled with sufficient exactness for the purpose in view. As illustrated the said recesses are of less depth than the declivity 69 which produces the movement of the flame at the terminal part of the weld. The opposite side of the larger recess 71 extending from the declivity 69 causes the follower 31 to ride up again upon the general surface of the cam, in order to depress the flame to its normal working position against the tension of the spring 32, and the slope and position of this incline are immaterial, provided they are such as to restore the torch to the working position without undue jar and in time for the arrival of the forward end of the next piece to be welded.

The operation of the mechanism has now been described in respect to its several parts, and a brief summary will, therefore, suffice.

Figure 1:
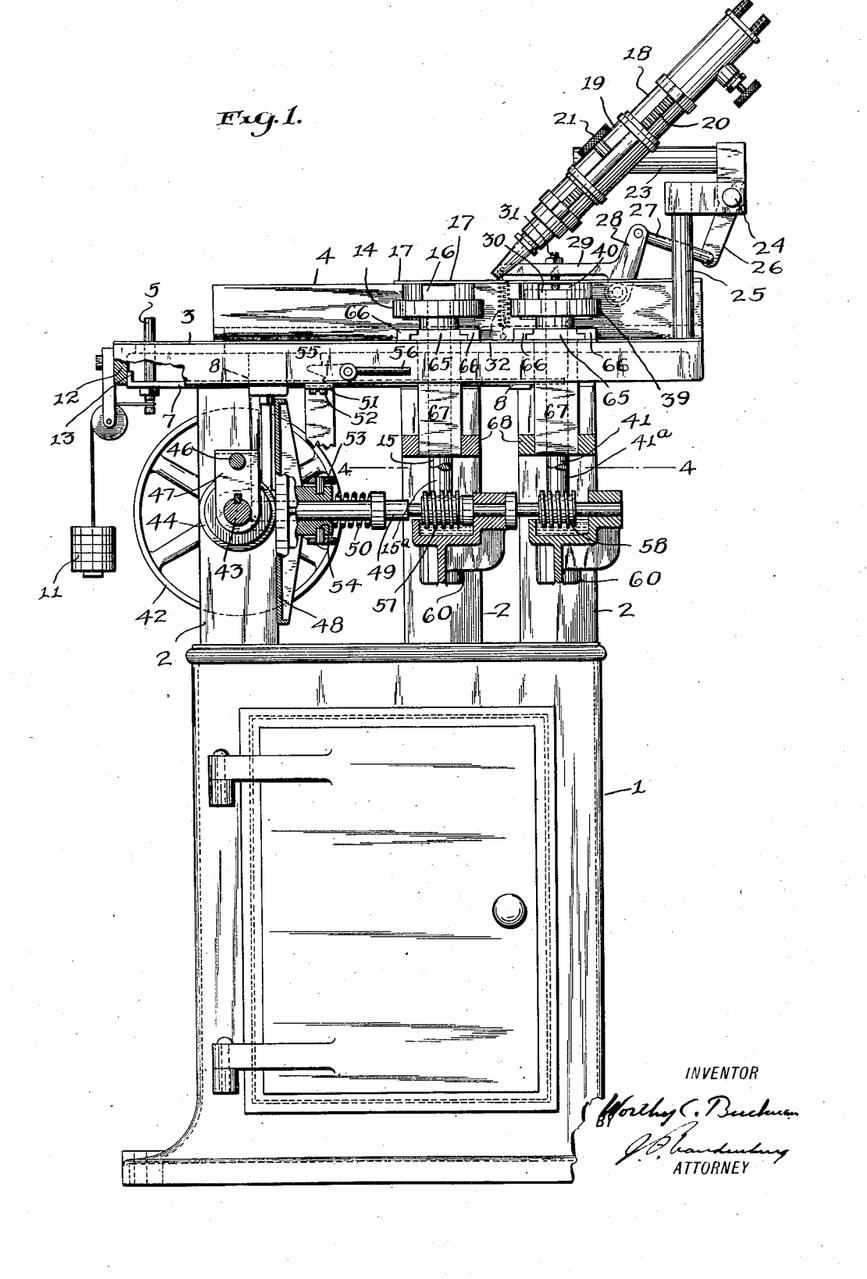
Figure 1 is a side elevation of the preferred embodiment of the invention, with portions shown broken away and in section.
Figure 2:
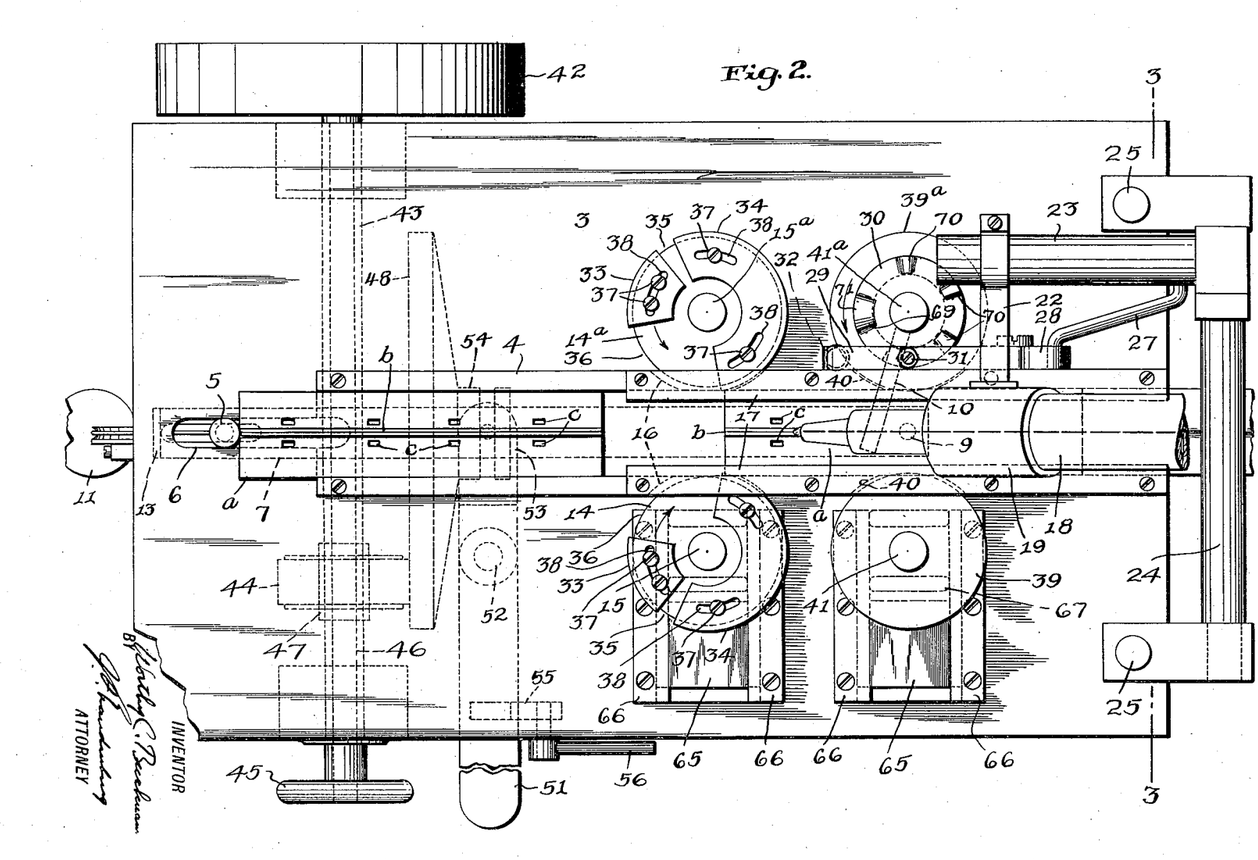
Fig. 2 is a plan view, showing pieces in different stages of their progress through the machine.

The pieces to be welded follow each other through the machine in the longitudinal course defined by the trough 4, wherein a number of the pieces will be observed in various positions in Fig. 2.

Figure 7:
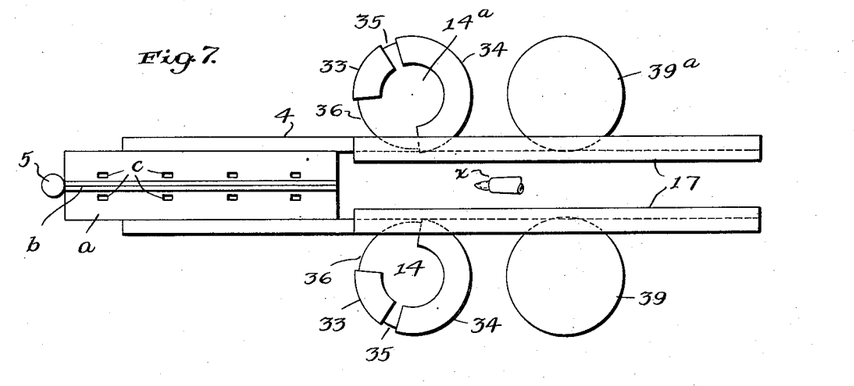
Figs. 7 to 11 are diagrammatic plan views and Figs. 12 and 13 diagrammatic side views illustrating the operation.
Figure 8:
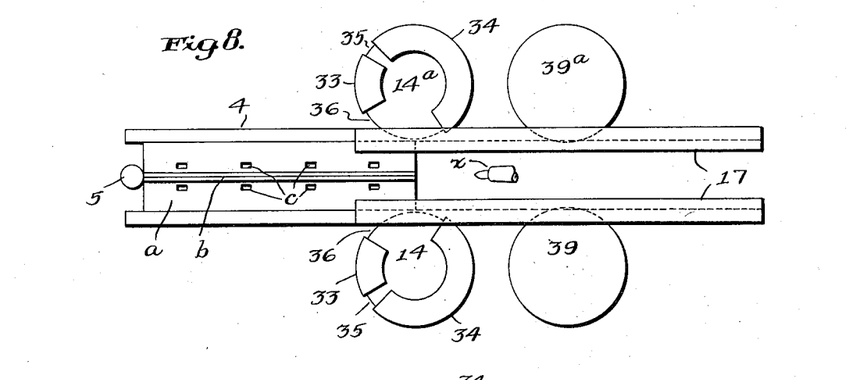
Figure 9:
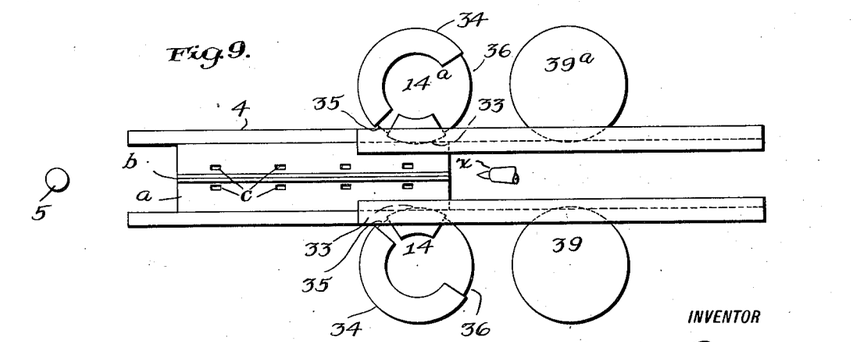
Figure 10:
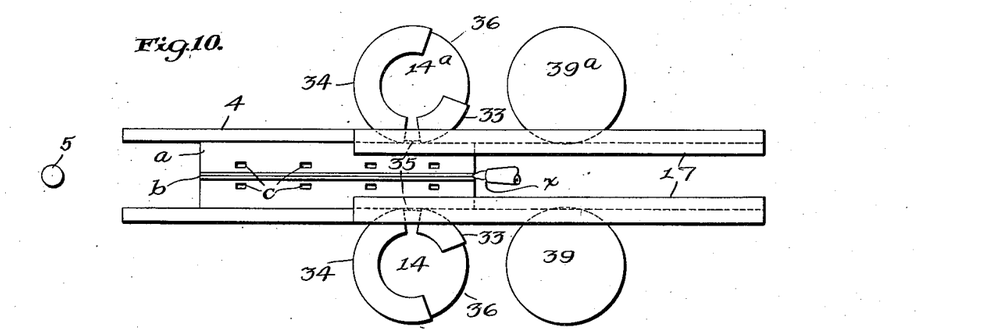
Figure 11:
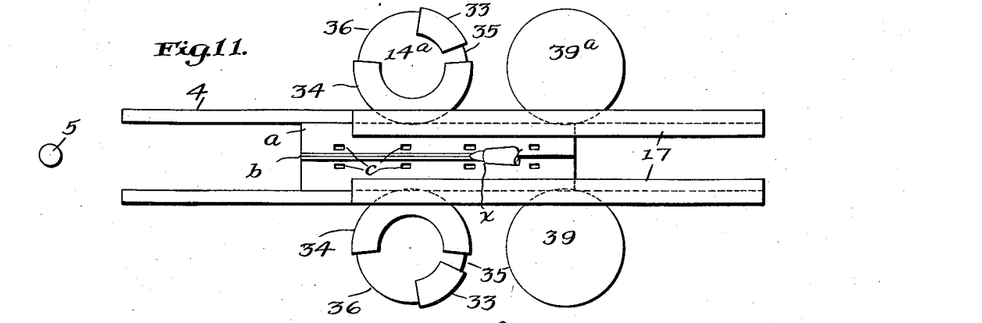
Figure 12:
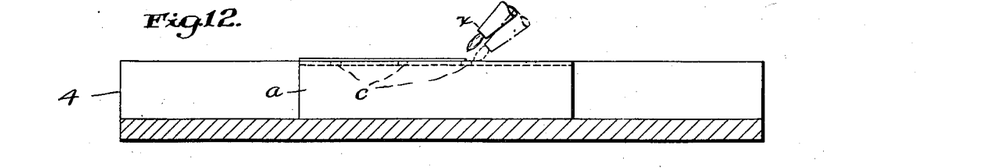
Figure 13:
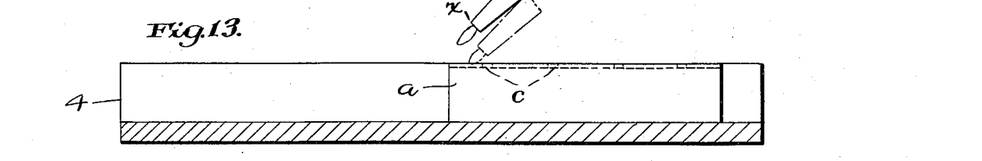

Referring to the diagrams, Fig. 7 shows a piece $a$ in the initial position, partly in the trough and against the reciprocatory pusher-pin 5, then held retracted by the weight 11. A torch tip and flame are represented at x. Fig. 8 illustrates the next stage, in which the piece has been advanced by the forward movement of the slide to a definite waiting position, where its forward portion lies between the inactive regions 36 of the timing wheels 14, 14ª, which at this time are presented inwardly of the trough. In Fig. 9 the segments 33 have been brought by the revolution of the timing rollers into engagement with the sides of the piece and are forwarding it toward the flame. Fig. 10 shows the front end of the seam at the welding point and the piece at rest because of the gaps 35 in the rollers being opposite its sides. During this period the forward end of the seam becomes heated to the welding point, and the region immediately in rear thereof is preheated sufficiently so that the weld may progress uniformly when the segments 34 take hold of the piece and start it upon its travel beneath the flame. As heretofore indicated, the length of this period of rest will depend upon the particular conditions of the case. In Fig. 11 the intitial heating period has been completed and the piece is performing its traverse at uniform speed under the propulsion of the segments 34, this movement to be continued by the plain rollers 39, 39ª, of equal radius of curvature. Fig. 12 represents the slight, controlled, raising or withdrawal of the flame as one of the regions c reaches the welding zone, dotted lines indicating the normal position of the flame and full lines the raised position. Fig. 13 indicates diagrammatically the movement which is given to the torch and flame toward the conclusion of the weld. As heretofore explained, this movement is preferably progressive and of an accelerating character. The final degree of separation and the point in advance of the end of the seam at which the separation commences will depend upon the particular set of conditions for which the machine is designed or adjusted.

What I claim as new is:

1. In a machine for welding the seams of successive pieces, the combination with a mechanically supported autogeneous welding torch, of mechanism for successively positioning the pieces with the forward ends of their seams at the welding point, there causing them to rest for a definite period, and then longitudinally advancing them at welding speed.

2. In a machine for welding the seams of successive pieces, the combination of means for delivering an autogeneous welding flame at a definite point, and mechanism for moving the pieces through a longitudinal course to and past the flame including means for intermitting the movements for a definite period with the forward part of the seam presented to the flame.

3. In a machine for welding the seams of successive pieces, the combination with means for delivering an autogeneous welding flame at a definite point, of rotary mechanism for moving each piece longitudinally to a position with the forward end of its seam at the welding point, there causing them to rest for a definite period, and then carrying it onward in welding relation to the flame, and reciprocatory pusher mechanism for advancing the successive pieces into position to be acted upon by said rotary mechanism.

4. In a machine for welding the seams of successive pieces, the combination with means for delivering an autogeneous welding flame at a definite point, of roller mechanism for bringing each successive piece to the welding point and thereafter traversing its seam with reference thereto, one or a pair of rollers of said mechanism having an interval in their driving portions determining a period of rest during which the forward end of the seam becomes heated.

5. In a machine for welding the seams of successive pieces by the autogeneous welding flame and having means for delivering a welding flame at a definite point, means for successively presenting the pieces to the flame and traversing them with reference thereto comprising rollers at opposite sides of the path of travel, with means for driving one or a pair of said rollers, which rollers have peripheral regions adapted, respectively, to bring the forward ends of the seams to the welding point, to cause the pieces to rest in this position for a definite period, and then to propel them in the welding traverse.

6. In a machine for welding the seams of successive pieces having means for delivering a welding flame at a definite point, the combination of one or a pair of driven timing rollers beside the path of travel of the pieces having peripheral regions adapted, respectively, to bring the forward ends of the seams to the welding point, to cause the pieces to rest in this position for a definite period, and then to carry them forward beneath the flame, and succeeding plain driven rollers for continuing the travel of the pieces.

7. A machine for welding the seams of successive pieces by the autogeneous welding flame, having means for delivering the flame at a definite point, and means for moving each piece in a longitudinal path to bring the forward end of the seam to the welding point and after a definite period of rest in such position to carry the piece onward in operative relation to the flame, said means comprising a roller for driving the pieces having first and second driving segments separated by a gap corresponding to said period of rest, and having another idle space adjoining the leading end of the first segment adapted to embrace the arriving ends of the pieces in position to be acted upon by the roller.

8. A machine for welding the seams of successive pieces by the autogeneous welding flame, having means for delivering the flame at a definite point, and means for moving each piece in a longitudinal path to bring the forward end of the seam to the welding point and after a definite period of rest in such position to carry the piece onward in operative relation to the flame, said means comprising a roller for driving the pieces having first and second driving segments separated by a gap corresponding to said period of rest, and having another idle space adjoining the leading end of the first segment adapted to embrace the arriving ends of the pieces in position to be acted upon by the roller, and reciprocatory means for advancing each piece to a definite position to await the action of said first segment.

9. A machine for welding the seams of successive pieces by the autogeneous welding flame, having means for delivering the flame at a definite point, and means for moving each piece in a longitudinal path to bring the forward end of the seam to the welding point and after a definite period of rest in such position to carry the piece onward in operative relation to the flame, said means comprising a roller for driving the pieces having separate driving segments mounted thereon, with means for varying the gap determining said period of rest.

10. A machine for welding the seams of successive pieces by the autogenous welding flame having means for delivering the flame at a definite point, a guide trough for the pieces, and a timing and driving roller operating through the side of the trough and having separate driving segments for bringing the forward end of the seam of each piece to the welding point and after a definite period of rest in this position carrying it onward in operative relation to the flame.

11. A machine for welding the seams of successive pieces by the autogenous welding flame, having means for delivering the flame at a definite point, a guide trough for the pieces, and a timing and driving roller operating through the side of the trough and having separate driving segments for bringing the forward end of the seam of each piece to the welding point and after a definite period of rest in this position carrying it onward in operative relation to the flame, and reciprocatory means for advancing the pieces successively in the trough to a definite position to await the action of said roller.

12. Apparatus for effecting automatic welding of pieces by the autogenous welding flame, having torch and work supporting means, and means for producing relative drive in the direction of the seam, characterized by means for automatically intermitting said drive for a definite period with the forward end of the seam at the welding point.

13. In apparatus for effecting automatic welding of pieces by the autogenous welding flame, having means for supporting the work and torch and means for producing relative drive at uniform speed in the direction of the seam, the combination of means for automatically intermitting said drive for a definite period with the forward end of the seam at the welding point and means for automatically producing a controlled withdrawal of the flame as the end of the weld is approached.

14. In apparatus for effecting automatic welding of pieces by the autogenous welding flame, having means for supporting the work and torch and means for producing relative drive at uniform speed in the direction of the seam, the combination of means for automatically intermitting said drive for a definite period with the forward end of the seam at the welding point and means for automatically producing an accelerating withdrawal of the flame in a direction other than that of the drive as the end of the weld is approached.

15. In a continuously acting machine for effecting automatic welding of successive pieces by the autogenous welding flame, the combination of a mechanically-supported torch, means for driving the successive pieces relatively thereto at uniform speed following a definite interval during which each piece remains stationary with the forward end of its seam at the welding point, and means for automatically lifting the torch as the rear end of the seam approaches said point in the course of the welding traverse.

16. Apparatus for effecting automatic welding of pieces by the autogenous welding flame, having means for supporting the torch and work and mechanism for producing relative drive in the direction of the seam, and means for producing an accelerating separation of the flame from the seam beginning at a predetermined point in advance of the end of the weld.

17. Apparatus for effecting automatic autogenous flame welding of pieces having regions of low conductive capacity at one or more points along the seam, including means for supporting the torch and work and producing relative uniform drive in the direction of the seam, characterized by means for automatically withdrawing the flame as the said portions of the seam are reached in such manner as to compensate for the lower conductive capacities, the flame remaining generally at fixed distance from the seam.

18. In an autogenous flame welding machine, driven rollers for moving the work relatively to the flame, one of said rollers being spring-pressed inwardly of the path of travel, a driving element for said roller, and interengaging pins forming a driving connection between the driving element and roller.

19. The method of uniting a seam by the autogenous welding flame, which comprises supporting the flame and seam at definite distance and producing relative drive at uniform speed between the two, with a definite period of rest while the initial portion of the seam becomes heated and an accelerated withdrawal of the flame toward the terminal portion.

20. The method of uniting a seam by the autogenous welding flame, which comprises supporting the flame and seam at definite distance and producing relative drive at uniform speed between the two, and compensating for differences in heat conduction at one or more portions of the seam by increasing the working distance between the flame and seam.

21. The method of uniting a seam by the autogenous welding flame, which comprises supporting the flame and seam at definite distance and producing relative drive at uniform speed between the two, and compensating for differences in heat conduction at one or more portions of the seam by controllably withdrawing the flame.

WORTHY C. BUCKNAM.